United States Patent
Schneider

(10) Patent No.: US 8,328,609 B2
(45) Date of Patent: Dec. 11, 2012

(54) VENTILATION ASSEMBLY FOR THE PRESSURE RELIEF OF THE INTERIOR OF AN AUTOMOBILE

(75) Inventor: Daniel Schneider, Tauberrettersheim (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 823 days.

(21) Appl. No.: 12/440,820

(22) PCT Filed: Nov. 16, 2007

(86) PCT No.: PCT/IB2007/003540
§ 371 (c)(1),
(2), (4) Date: Mar. 11, 2009

(87) PCT Pub. No.: WO2008/068565
PCT Pub. Date: Jun. 12, 2008

(65) Prior Publication Data
US 2009/0280736 A1    Nov. 12, 2009

(30) Foreign Application Priority Data
Dec. 1, 2006 (DE) .......................... 10 2006 056 868

(51) Int. Cl.
*B60H 1/24* (2006.01)
(52) U.S. Cl. ........................ 454/162; 454/70; 454/359
(58) Field of Classification Search .......... 454/162–165, 454/259, 340, 359, 70
See application file for complete search history.

(56) References Cited

U.S. PATENT DOCUMENTS

| 3,835,475 | A | * | 9/1974 | Child ............................ 623/2.23 |
| 5,263,895 | A |   | 11/1993 | Kraus et al. |
| 5,601,117 | A | * | 2/1997 | Lewis et al. .................... 137/855 |
| 5,823,870 | A |   | 10/1998 | Emerling et al. |
| 5,904,618 | A |   | 5/1999 | Lewis |
| 6,837,784 | B2 | * | 1/2005 | Omiya et al. .................. 454/162 |
| 7,044,164 | B2 |   | 5/2006 | Carlson |
| 7,077,742 | B2 |   | 7/2006 | Stevenson et al. |
| 2005/0075064 | A1 | * | 4/2005 | Omiya et al. .................. 454/162 |
| 2009/0068940 | A1 | * | 3/2009 | Bloemeling et al. .......... 454/162 |

FOREIGN PATENT DOCUMENTS

| DE | 1679566 A1 | 10/1973 |
| EP | 0467095 A1 | 1/1992 |
| EP | 0874182 A2 | 10/1998 |
| EP | 0915302 A2 | 5/1999 |
| EP | 1026021 A1 | 8/2000 |
| EP | 1491373 A1 | 12/2004 |
| EP | 1584508 A1 | 10/2005 |
| GB | 1178994 | 1/1970 |

OTHER PUBLICATIONS

ISR for PCT/IB2007/003540 dated Apr. 29, 2008.

* cited by examiner

*Primary Examiner* — Steven B McAllister
*Assistant Examiner* — Jamil Decker
(74) *Attorney, Agent, or Firm* — Lowe Hauptman Ham & Berner LLP

(57) ABSTRACT

A back-air blocking device to ventilate a motor vehicle's inside space includes a frame or housing made of a first plastic, and a valve flap, made of flexible material, connected in one zone to the frame and in other zones resting against a sealing surface of said frame when the flap is in its rest position. The flap detaches off the sealing surface when subjected to a pressure differential. The valve flap is a thin plate made of a closed-pore, foamed material.

15 Claims, 2 Drawing Sheets

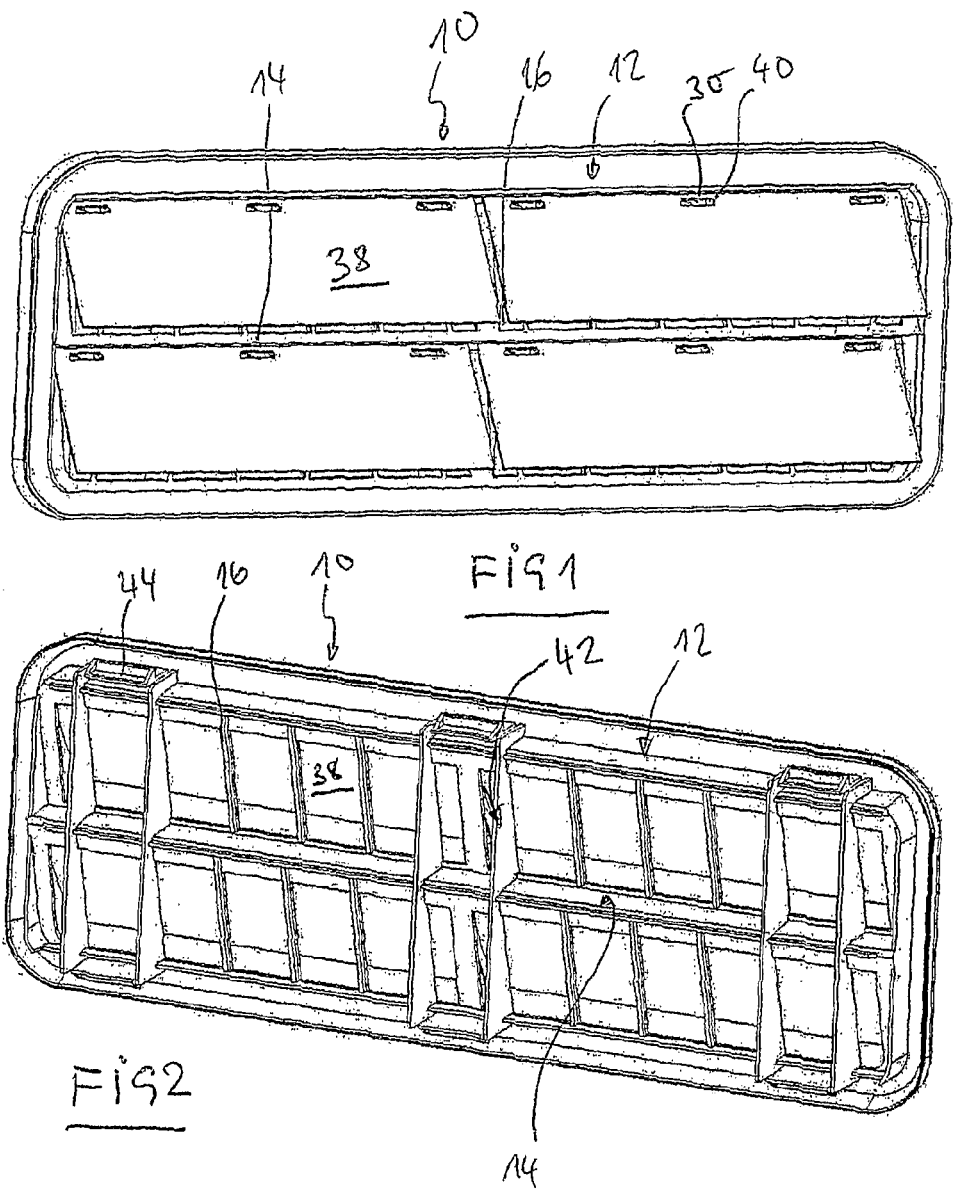

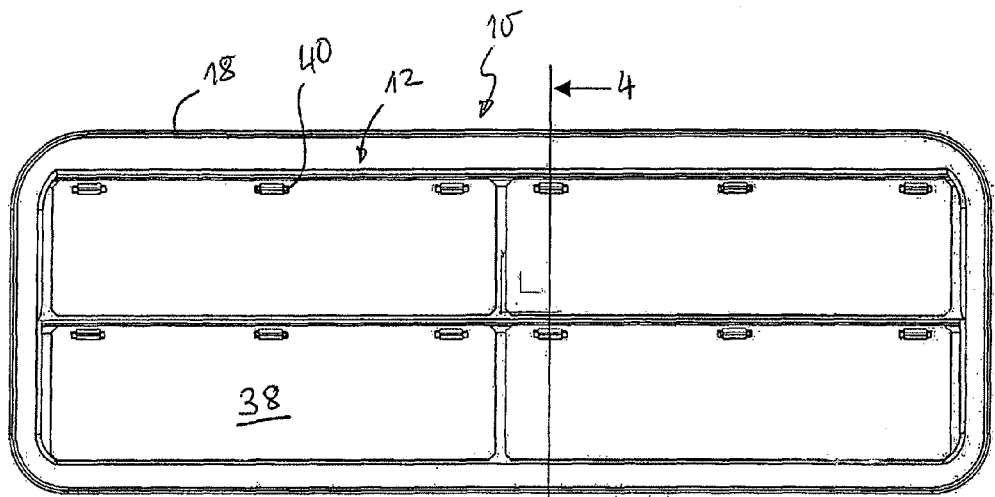
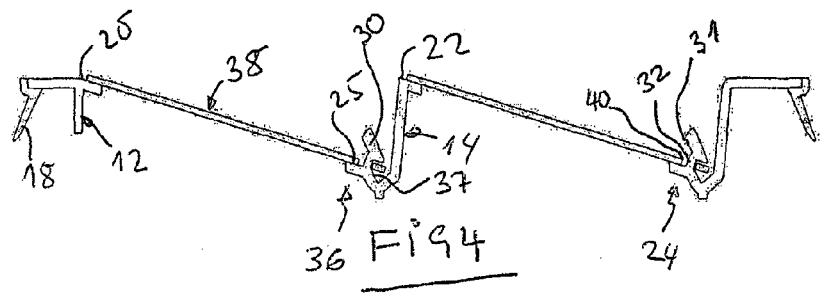
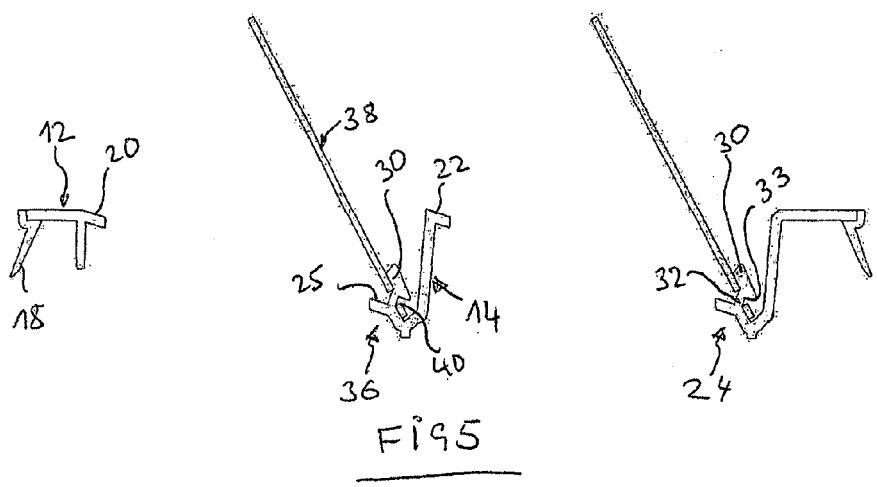

VENTILATION ASSEMBLY FOR THE PRESSURE RELIEF OF THE INTERIOR OF AN AUTOMOBILE

RELATED APPLICATIONS

The present application is based on International Application Number PCT/IB2007/003540 filed Nov. 16, 2007, and claims priority from German Application Number 10 2006 056 868.0 filed Dec. 1, 2006, the disclosures of which are hereby incorporated by reference herein in their entirety.

TECHNICAL FIELD

The present invention relates to a ventilation assembly, hereafter back-air blocking device, to ventilate a motor-vehicle inside space.

BACKGROUND

Ventilating devices of this kind are used in motor vehicles to allow for the exhausting of used air from inside of the motor vehicle. However such a device should not contribute to introduce air or contaminants into the motor vehicle inside.

A housing or frame of the ventilating device may be designed also in several parts and is inserted into a vehicle body aperture. Sealing flaps are mounted either pivotably or in flexing manner on the housing. At rest these flaps seal off the housing aperture, but they will move into an open position if the pressure inside the vehicle exceeds that of the outside ambience.

The German patent document DE 293 16 536 U1 discloses a back-air blocking device where the valve flap is made of a resilient material and mounted in a manner to generate a restoring force biasing said flap against the valve seat.

The European patent document EP 1 026 021 B1 discloses making the contact surface between the housing and the valve flap of different materials and keeping said surface small (linear rest). The purpose is to avoid clatter between the flap and the contact surface. The European patent document EP 0 467 095 B1 also discloses making the housing or frame of one piece with the valve flap and to connect latter by a foil hinge to the housing. The European patent document 1 584 508 A1 discloses using different plastics for the housing and the flap when flap and housing are integral. Illustratively such a valve flap is made of a comparatively flexible material whereas the housing is made of a more rigid material. Manufacture is by multi-component injection molding.

It is known from U.S. Pat. No. 5,823,870 to associate the valve flaps with stops precluding the valve flaps from opening excessively or too violently.

The European patent document EP 0 915 302 A2 discloses making valve flaps integrally with, but separate from a housing, knob-like housing protrusions entering apertures in the valve flaps. It is known from the European patent document EP 1 491 373 A1 to make cross-sectionally T-shaped protrusions at the frame which enter slots of resilient valve flaps.

Basically there is a need for the valve flap being easily and reliably displaceable, to be resting as tightly as possible in its closed state against the housing and to generate little or no noise.

Accordingly it is the objective of the present invention to create a back-air blocking device for the inside of a motor vehicle, meeting the above requirements and at the same time allowing very economical manufacture.

SUMMARY

In the present invention, the valve flap is a thin plate made of a closed-pore, foamed material.

The housing or the frame of the back-air blocking device of the present invention is made in known manner using a known two-component injection molding procedure to comprise one or more peripheral sealing lips made of a soft, flexible material to match the housing/frame to the geometry of the motor vehicle. Several hermetic plates of closed-pore foam are mounted in the housing/frame. The plates may be mounted by bonding, fusing or in other ways. The valve plates of the present invention are minimally thin to assure appropriate flexure. In this way they may operate like the rubber flaps or PET foils used in the state of the art. In the event the air pressure inside the vehicle exceeds that of the outside, the foam valve plate flexes outward and thereby opens an aperture in the frame.

A foam valve plate offers the advantage that it may be manufactured more economically than for instance a rubber flap. Another advantage is that the foam valve flap generates far less annoying noise. Due to their low weight, the foam valve flaps operate very smoothly.

As a result and in significant manner, the back-air blocking device of the present invention entails reduced cost of manufacture. Because the valve flaps evince some intrinsic stiffness, they are relatively easily affixed. Also they generate noise of little annoyance. Again, because of their low weight, the foam valve flaps run smoothly.

In one embodiment mode of the present invention, the valve flap is mechanically connected to the frame by a snap-in connection. In a further embodiment mode, the mechanical connection is designed in a manner that the valve flap can be rotated a given angle out of the rest toward the open position without being bent. Accordingly in the case of a slightly larger air pressure inside the vehicle than outside, the valve plate will not be bent. It merely detaches from its rest position against the frame and in this manner is able to balance the two pressures.

BRIEF DESCRIPTION OF DRAWINGS

One illustrative embodiment of the present invention is elucidated below in relation to the appended drawings.

FIG. 1 is a front view of a back-air blocking device of the invention,

FIG. 2 is the same view as in FIG. 1 but with the valve flaps open,

FIG. 3 is a rear view of the back-air blocking device of FIGS. 1 and 2,

FIG. 4 is a section along line 4-4 of FIG. 3, and

FIG. 5 shows a similar section relating to FIG. 2.

DETAILED DESCRIPTION

FIGS. 1 through 3 show a housing 10 for a back-air blocking device. Said housing comprises an approximately rectangular frame 12 subdivided centrally by a longitudinal bracket 14. Webs 16 subtending several rectangular apertures run equidistantly between the long sides of the frame 12 and the longitudinal bracket 14.

FIGS. 4 and 5 indicate the cross-sectional contours of the frame 12 and the longitudinal bracket 14. The housing 10 is made integrally of a comparatively harder plastic. A lip seal 18 is made by two-component injection molding on the outside of the frame 12. Said seal is made of a softer, more compliant material. The housing 10 is inserted into an omitted automobile body aperture in sealing manner thanks to the seal 18.

As indicated in FIGS. 4 and 5, the frame when seen cross-sectionally subtends an angle, the lower longitudinal portion of the frame constituting an outside rest and/or first sealing surface 20. In corresponding manner, the longitudinal bracket, which also is angled, subtends an outside rest and/or third sealing surface 22. The upper longitudinal side of the frame 12 shown in the Figures comprises a bearing segment 24 fitted with a protrusion. A corresponding protrusion is constituted in a corresponding bearing segment 36 of the longitudinal bracket 14. The bearing segments 24, 36 are fitted with a rest and/or second sealing surface 25, a web 32 and a lectern-like lug 30. The side of the lug 30 comprises at the underside a first stop face 31 facing the aperture and the opposite side comprises a second stop face 33. A third stop face is denoted by 37.

The bearing segments 24, 36 support one side of the valve flaps 38. The valves are made of a closed-pore plastic foam and they are relatively thin. At one longitudinal side they are fitted with longitudinal slots 40. The dimensions of the longitudinal slots 40 are selected in a manner that the lug 30 of the protrusions may be inserted with attending material deformation into the slots 40 while the web 32 runs freely through the slots 40. The length of the web 32 exceeds the thickness of the flap 38.

The width of the flaps 38 is selected in a manner that the end away from the bearing segment 24, 36 in the rest position rests on the rest and/or first sealing surface 20 and third sealing surface 22 respectively. The other end rests on the rest and/or second sealing surface 25 of the bearing segment 24, 36. Such a rest is due to gravity acting on the valve flaps 38.

When the housing 10 has been integrated into the vehicle, the lower part shown in the Figures points into the upper part to the outside of the vehicle.

If the air pressure inside the vehicle exceeds atmospheric, then, as shown in FIGS. 1 and 5, the valve flaps 38 pivot to open and allow air exhaustion from the vehicle. In the opposite case, that is when the ambient pressure is higher than inside the vehicle, the flaps 38 will move into their closed position. Moreover the flaps are supported in a manner that their weight keeps them in the closed position at equal pressures inside and outside the vehicle. FIG. 5 also indicates that the flaps 38 are supported in a way that they may pivot by a relatively large angle into their open position without undergoing deformation. If the pivot angle of FIG. 5 is exceeded, the flaps 38 will deform. While the flap material is fairly rigid, it is nevertheless well suited to undergo bending when subjected to significant forces.

In the maximum pivoted position shown in FIG. 5, the valve flap rests against the first stop face 31 and against the second stop face 37 that jointly constitute a means limiting the pivoting displacement. When the flap is in its closed position, the third stop face 33 precludes it from being detached from the rest and/or second sealing surface 25.

As shown in FIG. 2, the frame 12 is braced by additional reinforcements 42, namely midway its length and at the ends. Also, detent beaks 44 are constituted at the top and bottom of the reinforcements 42 and engage from behind an edge of the above cited aperture in the vehicle body when the housing 10 is inserted into the said aperture. In the process the sealing lip 18 makes sealing contact from the opposite side with the adjacent body surface to implement sealing.

Illustratively foamed polyethylene is used as the material of the valve flaps 38.

The invention claimed is:

1. A back-air blocking device to ventilate a motor vehicle's inside space, said device comprising:
    a frame made of plastic and having a longitudinal direction and a transverse direction perpendicular to the longitudinal direction, said frame further having
        first and second sealing surfaces opposite to each other in the transverse direction; and
        a valve flap detachably attached to the first and second sealing surfaces,
    wherein
    the valve flap rests against the first and second sealing surfaces when said valve flap is in a rest position,
    the valve flap detaches off both said first and second sealing surfaces when subjected to a pressure differential to move to an open position,
    the valve flap is a plate made of a closed-pore, foamed material,
    the frame further includes a bracket extending in the longitudinal direction and including first, second and third stop faces,
    the second stop face is opposite to the third stop face,
    in the rest position, at least the first and third stop faces are free of direct contact with the valve flap, and
    in the open position, the first and third stop faces directly contact the valve flap.

2. The device as claimed in claim 1, wherein the plate is flexible.

3. The device as claimed in claim 1, wherein, in the rest position, the valve flap rests by gravity against the first and second sealing surfaces.

4. The device as claimed in claim 1, wherein the valve flap is bonded to the frame.

5. The device as claimed in claim 1, wherein the valve flap is mechanically connected by a snap-in connection to the frame.

6. The device as claimed in claim 5, wherein the valve flap is pivotable by a given angle from the rest position to the open position while the entire valve flap is free of bending.

7. The device as claimed in claim 5, wherein
    the valve flap further comprises slots at an end corresponding to the second sealing surface of the frame, and
    the frame further comprises, adjacent to the second sealing surface, retention protrusions which protrude and snap into the slots, respectively.

8. The device as claimed in claim 7, wherein
    the frame further comprises lugs integrally formed with the corresponding retention protrusions, and
    a dimension of each of the lugs transverse to the slot is larger than a width of each of the slots.

9. The device as claimed in claim 8, wherein
    each of the lugs comprises the first stop face defining an angle with the second sealing surface and the second stop face facing toward the valve flap and defining the same angle with the second sealing surface,
    the frame further comprises a bearing segment that carries (i) the second sealing surface and (ii) the third stop face opposite to the second stop face, and
    the valve flap rests against the first and third stop faces when the valve flap reaches a maximum angle in the open position.

10. The device as claimed in claim 8, wherein a length of each of the retention protrusions is greater than a thickness of the valve flap.

11. The device as claimed in claim 1, further comprising another valve flap, wherein the frame further comprises a third sealing surface adjacent to the second sealing surface in the transverse direction and supports said another valve flap,
    wherein the third sealing surface is substantially parallel to the first and second sealing surfaces.

12. The device as claimed in claim 11, wherein the bracket carries the second and third sealing surfaces.

13. The device as claimed in claim 11, wherein
    said another valve flap further comprises slots at an end, and
    the frame further comprises retention protrusions which protrude and snap into the slots, respectively.

14. The device as claimed in claim 11, wherein said another valve flap is pivotable by a given angle from the rest position to the open position while the entire another valve flap is free of bending.

15. The device as claimed in claim 1, wherein the valve flap has two surfaces opposite to each other, and, in the open position, the first and third stop faces directly contact said two surfaces of the valve flap, respectively.

\* \* \* \* \*